O. GOBBE.
HEAT REGENERATOR FOR HEATING AIR OR GASES.
APPLICATION FILED MAR. 14, 1913.

1,086,322. Patented Feb. 3, 1914.

WITNESSES
M. G. Kerr
A. E. Powell

INVENTOR
Olivier Gobbe
By Howson and Howson
his ATTORNEYS

O. GOBBE.
HEAT REGENERATOR FOR HEATING AIR OR GASES.
APPLICATION FILED MAR. 14, 1913.

1,086,322.

Patented Feb. 3, 1914.

2 SHEETS—SHEET 2.

WITNESSES

INVENTOR
Olivier Gobbe
By Howson and Howson
his Attorneys

UNITED STATES PATENT OFFICE.

OLIVIER GOBBE, OF JUMET, BELGIUM.

HEAT-REGENERATOR FOR HEATING AIR OR GASES.

1,086,322.    Specification of Letters Patent.    Patented Feb. 3, 1914.

Application filed March 14, 1913. Serial No. 754,353.

*To all whom it may concern:*

Be it known that I, OLIVIER GOBBE, a subject of the King of Belgium, and resident of Jumet, Belgium, have invented certain new and useful Improvements in or Relating to Heat-Regenerators for Heating Air or Gases, of which the following is a specification.

In order that a heat regenerator may be air tight, it is necessary that its tightness should not be dependent on the vertical joints of the hollow brickwork of which it consists. As a matter of fact when the temperature of a regenerator increases, the material of the furnace expands and the vertical walls which hold together the mass of the regenerator are slightly pushed outward. When sufficient cooling occurs, the refractory materials of the furnace shrink and as nothing constrains the vertical walls to follow this shrinkage they remain in their position and small vertical cracks are formed in the regenerator into which cracks particles torn from the brickwork can penetrate. Every time a variation of temperature occurs in the generator, the same thing is repeated and fresh particles fall into the vertical cracks which keep constantly becoming wider. If therefore the air-tightness of a regenerator depends on the vertical joint, or joints, the generator becomes of little or no use in a very short time. Now this is just what occurs in most regenerators hitherto constructed and in order to overcome this serious defect in regenerators of the present day, I have designed the regenerator which forms the object of the present invention.

Figure 1:
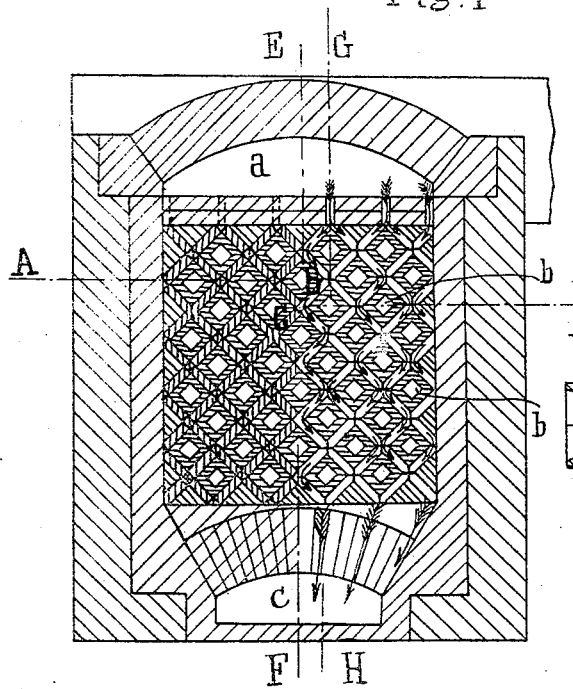
Figure 5:
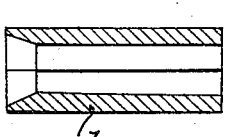
Figure 6:
Figures 7, 8:
Figure 4:
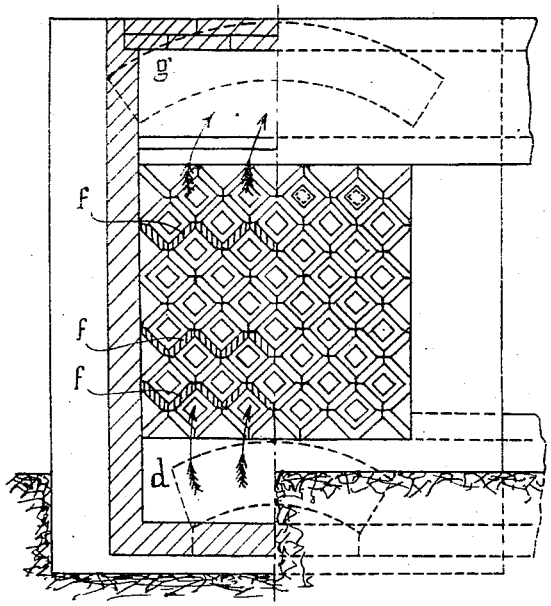
Figure 2:
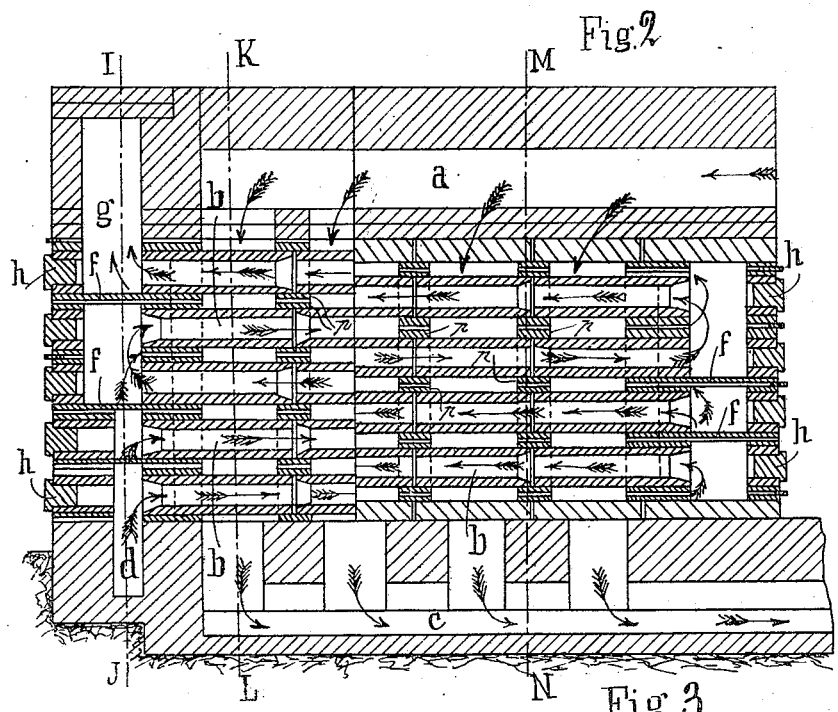
Figure 3:
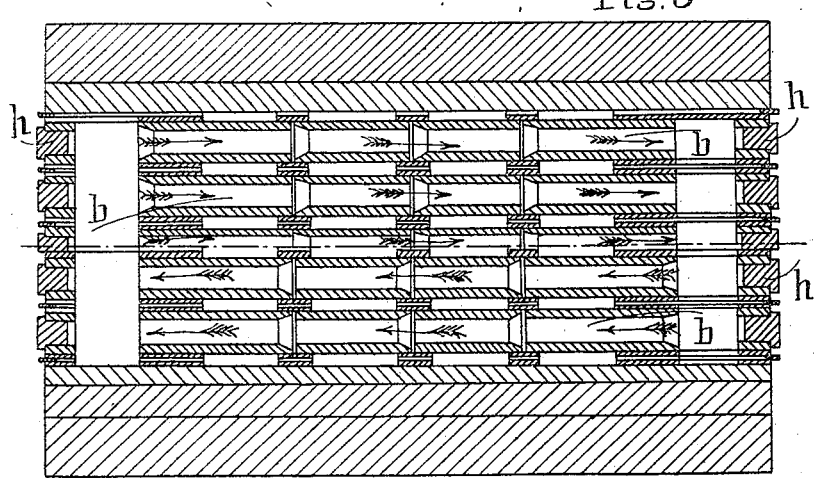

The apparatus is shown in transverse section in Figure I, in longitudinal section in Fig. II, in horizontal section in Fig. III and in cross section and elevation in Fig. IV. Fig. V is a longitudinal section on line 5—5, Fig. VI; Fig. VI is an end elevation of one of the hollow blocks out of which the regenerator is constructed; Fig. VII is a side elevation of a joint cover plate; and Fig. VIII is a cross section on line 8—8, Fig. 7.

Fig. I shows on the right hand side a section at the line K—L, Fig. II, while at the left Fig. I shows a section taken at M, N, Fig. II. The left of Fig. II shows the section taken at G—H, Fig. I, while the right of Fig. II shows the section taken at E—F, Fig. I. The left of Fig. IV shows the section taken at I—J, Fig. II, while the right side of Fig. IV shows an end elevation.

Ordinary hollow bricks $b$ (Fig. V) having neither tenon, mortise, groove, nor other special constructive feature will suffice to construct a regenerator, according to the present invention. Instead of being laid flat on one another with their horizontal faces downward as heretofore, the hollow bricks rest on two inclined faces, the angles of these bricks being at the top, bottom and on the sides and being spaced apart by plates $p$ which cover the butt joints between the ends of adjacent hollow bricks. This special way of laying the bricks has for its object to do away with all the vertical joints of the full faces of these bricks and there are only left the vertical joints of the end faces of these bricks, which joints are without influence on the air tightness of the furnaces, because these vertical joints are closed by butt joint covers held in place by the weight of the bricks. The hollow bricks of this regenerator are slightly spread out internally on one end, as shown in Fig. V.

In the drawings the arrows show how the hot smoke and gases, coming from any furnace through a collecting channel $a$ run in a downward direction around and over the hollow brickwork $b$ with which the smoke and gases come into contact over all its faces, before they pass in a cooled state to the collecting passage $c$ which leads them to the chimney. The products of combustion therefore pass through the apparatus in a vertical downward direction. Cold air enters the hollow brickwork $b$ through a small collecting passage $d$, then passes into the lowermost row of hollow bricks $b$ and then flows through the regenerator from right to left and returns through the second row in the reverse direction as indicated by the horizontal arrows. Elongated plates $f$ are suitably arranged at the ends of the horizontal passages according to the volume occupied by the air, which volume rapidly increases with the temperature. The two last rows of heated air unite in a collector $g$ which directs the air to the place where it is to be utilized. The heating of the air is therefore quite methodical, progressive and rational, which result is effected by means of an apparatus which is simple in construction and cheap, occupies little space and can be examined through plugs *h* provided at the ends of the horizontal passages.

I claim as my invention:—

1. A heat regenerator having air flues consisting of horizontal rows of hollow bricks, set up to rest on inclined faces, as described, cover plates for the butt joints at the ends of adjacent bricks, said cover plates spacing the rows of bricks apart and forming, between superposed and longitudinally adjacent cover plates, a series of passageways for the flow of heated gases around the hollow bricks and transversely to the flow of air therethrough, substantially as described.

2. A heat regenerator having air flues in superposed layers consisting of horizontal rows of hollow bricks, set up to rest on inclined faces, as described, cover plates for the butt joints at the ends of adjacent bricks, said cover plates spacing the rows of bricks apart and forming, between superposed and longitudinally adjacent cover plates, a series of passageways for the flow of heated gases around the hollow bricks and transversely to the flow of air therethrough, together with means for leading a blast of air in opposite directions through superposed flues, substantially as described.

3. A heat regenerator having air flues in superposed layers consisting of horizontal rows of hollow bricks, set up to rest on inclined faces, as described, cover plates for the butt joints at the ends of adjacent bricks, said cover plates spacing the rows of bricks apart and forming, between superposed and longitudinally adjacent cover plates, a series of passageways for the flow of heated gases around the hollow bricks and transversely to the flow of air therethrough, together with adjustable means for leading a blast of air in opposite directions through superposed flues, substantially as described.

4. A heat regenerator having air flues consisting of horizontal rows of hollow bricks set up to rest on inclined faces, as described, cover plates for the butt joints at the ends of adjacent bricks, said cover plates spacing the rows of bricks apart and forming, between superposed and longitudinally adjacent cover plates a series of passageways, means for leading hot gases downward through said passage-ways around the hollow bricks transversely to the flow of air therethrough, and means for leading an air blast to the lowermost of said air flues and in an opposite direction through superposed flues, substantially as described.

In testimony whereof I have signed my name to this specification, in the presence of two subscribing witnesses.

OLIVIER GOBBE.

Witnesses:
 GUSTAVE PIERRY,
 EMILE NUYTZ.